(12) United States Patent
Tanaka

(10) Patent No.: US 10,401,755 B2
(45) Date of Patent: Sep. 3, 2019

(54) SCANNING APPARATUS AND IMAGE FORMING APPARATUS

(71) Applicant: CANON KABUSHIKI KAISHA, Tokyo (JP)

(72) Inventor: Shunsuke Tanaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/181,156

(22) Filed: Nov. 5, 2018

(65) Prior Publication Data

US 2019/0146370 A1   May 16, 2019

(30) Foreign Application Priority Data

Nov. 13, 2017   (JP) ................. 2017-217947

(51) Int. Cl.
| G03G 15/04 | (2006.01) |
| G03G 15/043 | (2006.01) |
| G02B 26/08 | (2006.01) |
| G02B 26/12 | (2006.01) |

(52) U.S. Cl.
CPC ....... G03G 15/043 (2013.01); G02B 26/0816 (2013.01); G02B 26/121 (2013.01)

(58) Field of Classification Search
CPC .......... G03G 15/043; G03G 15/04045; G03G 15/5062; G02B 26/0816; G02B 26/121; B41J 2/435
See application file for complete search history.

(56) References Cited

U.S. PATENT DOCUMENTS

| 5,864,355 | A | 1/1999 | Bush et al. .................. 347/235 |
| 6,064,419 | A | 5/2000 | Uchiyama .................... 347/250 |
| 6,614,464 | B2* | 9/2003 | Kishida ............... G02B 26/122 347/250 |
| 7,652,682 | B2 | 1/2010 | Ushio .......................... 347/235 |
| 8,786,916 | B2* | 7/2014 | Nakazawa ......... H05B 33/0845 348/222.1 |
| 9,357,097 | B1 | 5/2016 | Tanaka .................. H04N 1/113 |

FOREIGN PATENT DOCUMENTS

| JP | H08-248336 | 9/1996 |
| JP | H08-276617 | 10/1996 |
| JP | 2008-290447 | 12/2008 |

* cited by examiner

*Primary Examiner* — Hoang X Ngo
(74) *Attorney, Agent, or Firm* — Venable LLP

(57) ABSTRACT

The scanning apparatus includes a control unit that controls an emission state of a light source to perform switching between first and a second emission states, wherein as a signal according to a light amount, an output unit outputs a first value when light received by the output unit has a first light amount and outputs a second value when the light received by the output unit has a second light amount larger than the first light amount, and the control unit performs switching from the first emission state to the second emission state when an output time period of a signal of the second value corresponding to the second light amount is equal to or more than a predetermined time period.

20 Claims, 10 Drawing Sheets

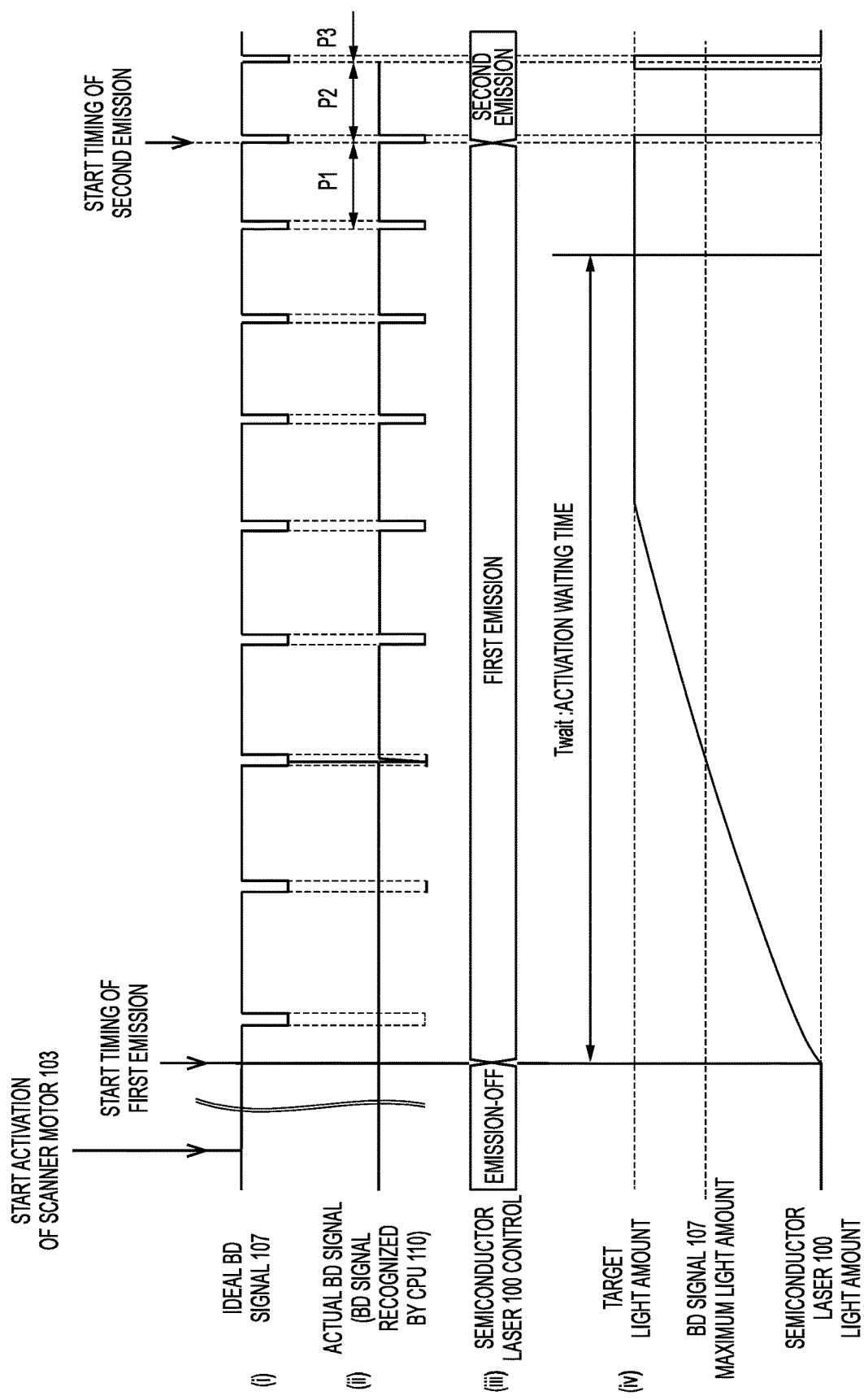

SCANNING APPARATUS AND IMAGE FORMING APPARATUS

BACKGROUND OF THE INVENTION

Field of the Invention

The present invention relates to a scanning apparatus and an image forming apparatus and particularly relates to a scanning optical apparatus mounted on an image forming apparatus.

Description of the Related Art

An activation method of a scanning apparatus mounted on a laser beam printer is, for example, as follows. In activation of the scanning apparatus, laser is controlled not to be radiated in an image area on a photosensitive member by control (hereinafter referred to as unblanking control) of limiting a laser emission area to a non-image area out of an all-scanning area for the laser (for example, see U.S. Pat. No. 5,864,355).

However, there is a problem below in the conventional art. The unblanking control cannot be performed by the time of detecting a BD synchronous signal with a horizontal synchronous sensor, commonly known as BD (Beam Detect), which detects synchronous timing in scanning on the photosensitive member since the scanning position of the laser cannot be specified. The control unit cannot detect the BD synchronous signal since the BD synchronous signal is not output when the emission light amount of the laser is not more than a threshold of the BD. In the conventional art, switching to the unblanking control is performed after laser is emitted in the whole area for a fixed time period corresponding to a time period when the emission light amount of the laser is stabilized to be equal to or more than a predetermined light amount with a deviation thereof. This problematically causes unnecessary scanning in the image area on the photosensitive member for such a fixed time period corresponding to the time period when the emission light amount of the laser is stabilized to be equal to or more than the predetermined light amount.

An aspect of the present invention is a scanning apparatus which prevents unnecessary scanning of laser onto a photosensitive member to further shorten a time period when laser is emitted in the whole area before switching to unblanking control in activation of a scanning apparatus.

SUMMARY OF THE INVENTION

Another aspect of the present invention is a scanning apparatus including a light source, a deflection unit configured to deflect and scan light emitted from the light source, an output unit configured to receive light scanned in a second area different from a first area in which light according to image data is scanned, in an area in which the deflection unit scans the light, and output a signal according to a light amount, and a control unit configured to control an emission state of the light source to perform switching between a first emission state in which light source emits light to scan the light in the first area and the second area and a second emission state in which the light source emits light to scan the light in the second area, wherein the output unit outputs a signal of a first value according to a light amount in a case where the light received by the output unit has a first light amount and outputs a signal of a second value in a case where the light received by the output unit has a second light amount larger than the first light amount, and the control unit controls the emission state of the light source to perform switching from the first emission state to the second emission state in a case where an output time period of a signal of the second value corresponding to the second light amount is equal to or more than a predetermined time period.

A further aspect of the present invention is a scanning apparatus including a light source, a deflection unit configured to deflect and scan light emitted from the light source, an output unit configured to receive the light scanned by the deflection unit and output a signal according to a light amount of the light received by the output unit, a control unit configured to control an emission state of the light source to perform switching between a first emission state in which the light source continuously emits light and a second emission state in which the light source intermittently emits light, wherein in the second emission state, a time period when the light is emitted is shorter than in the first emission state, wherein in the first emission state and the second emission state, the light is emitted at least during a time period when the output unit receives the light, as the signal according to the light amount, the output unit outputs a signal of a first value in a case where the light received by the output unit has a first light amount and outputs a signal of a second value according to a light amount the light received by the output unit has a second light amount larger than the first light amount, and the control unit controls the emission state of the light source to perform switching from the first emission state to the second emission state when an output time period of a signal of the second value corresponding to the second light amount is equal to or less than a predetermined time period.

A further aspect of the present invention is an image forming apparatus including a photosensitive member on which an electrostatic latent image is to be formed, a scanning apparatus configured to form the electrostatic latent image on the photosensitive member, a developing unit configured to develop the electrostatic latent image formed on the photosensitive member with toner and to form a toner image, and a transfer unit configured to transfer the toner image formed on the photosensitive member by the developing unit onto a recording material, wherein the scanning apparatus includes a light source, a deflection unit configured to deflect and scan light emitted from the light source, an output unit configured to receive light scanned in a second area different from a first area in which light according to image data is scanned, in an area in which the deflection unit scans the light, and output a signal according to a light amount, and a control unit configured to control an emission state of the light source to perform switching between a first emission state in which light source emits light to scan the light in the first area and the second area and a second emission state in which the light source emits light to scan the light in the second area, wherein the output unit outputs a signal of a first value according to a light amount in a case where the light received by the output unit has a first light amount and outputs a signal of a second value according to a light amount in a case where the light received by the output unit has a second light amount larger than the first light amount, and the control unit controls the emission state of the light source to perform switching from the first emission state to the second emission state in a case where an output time period of a signal of the second value corresponding to the second light amount is equal to or more than a predetermined time period.

A further aspect of the present invention is an image forming apparatus including a photosensitive member on which an electrostatic latent image is to be formed, a scanning apparatus configured to form the electrostatic latent image on the photosensitive member, a developing unit configured to develop the electrostatic latent image formed on the photosensitive member with toner and to form a toner image, and a transfer unit configured to transfer the toner image, on the photosensitive member, formed by the developing unit to a recording material, wherein the scanning apparatus includes a light source, a deflection unit configured to deflect and scan light emitted from the light source, an output unit configured to receive the light scanned by the deflection unit and output a signal according to a light amount of the light received by the output unit, and a control unit configured to control an emission state of the light source to perform switching between a first emission state in which the light source continuously emits light and a second emission state in which the light source intermittently emits light, wherein in the second emission state, a time period when the light is emitted is shorter than in the first emission state, wherein in the first emission state and the second emission state, the light is emitted at least during a time period when the output unit receives the light, as the signal according to the light amount, the output unit outputs a signal of a first value according to a light amount in a case where the light received by the output unit has a first light amount and outputs a signal of a second value according to a light amount in a case where the light received by the output unit has a second light amount larger than the first light amount, and the control unit controls the emission state of the light source to perform switching from the first emission state to the second emission state when an output time period of a signal of the second value corresponding to the second light amount is equal to or less than a predetermined time period.

Further features of the present invention will become apparent from the following description of exemplary embodiments with reference to the attached drawings.

BRIEF DESCRIPTION OF THE DRAWINGS

FIGS. 4A and 4B illustrate timing charts for describing activation control of the scanning apparatus of Embodiment 1.

DESCRIPTION OF THE EMBODIMENTS

Preferred embodiments of the present invention will now be described in detail in accordance with the accompanying drawings.

Hereafter, modes for implementing the present invention are exemplarily described based on embodiments in detail with reference to the drawings. Note that the followings are to be properly changed depending on the configuration of an apparatus which the present invention is applied to and various conditions thereof: the dimensions, materials and shapes of components described for the embodiments, relative arrangements thereof, and the like. Namely, the scope of the present invention is not intended to be limited to the embodiments below.

Embodiment 1

[Configuration of Image Forming Apparatus]

Figure 1A:
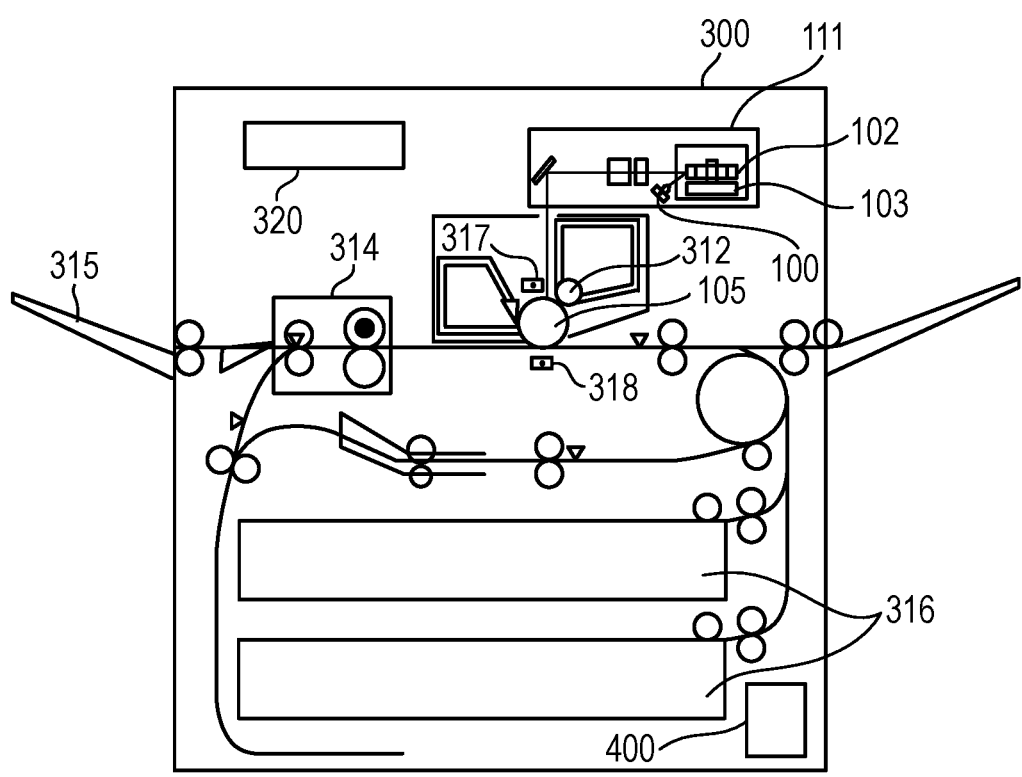
FIG. 1A is a diagram illustrating an image forming apparatus of each of Embodiments 1 to 3.

A laser beam printer is exemplarily described as an image forming apparatus common to the embodiments. FIG. 1A illustrates a schematic configuration of a laser beam printer which is an example of an electrophotographic printer. A laser beam printer (hereinafter referred to as printer) 300 includes a photoreceptive drum 105 as a photosensitive member on which an electrostatic latent image is formed, and a charging device 317 (charging unit) which uniformly charges the photoreceptive drum 105. Moreover, the printer 300 includes a scanning apparatus 111 which forms an electrostatic latent image on the photoreceptive drum 105. The scanning apparatus 111 includes a rotary polygon mirror 102, a scanner motor 103 which drives the rotary polygon mirror 102, and a semiconductor laser 100 which emits laser light radiated for forming an electrostatic latent image on the photoreceptive drum 105. These are described later. Furthermore, the printer 300 includes a developing device 312 (developing unit) which develops the electrostatic latent image formed on the photoreceptive drum 105 with toner. Then, a toner image thus developed on the photoreceptive drum 105 is transferred onto a sheet (not shown) as a recording material fed from a cassette 316, by a transfer device 318 (transfer unit). The toner image transferred onto the sheet is fixed by a fixing unit 314 to be discharged to a tray 315. These photoreceptive drum 105, charging unit 317, developing unit 312, transfer unit 318 constitute an image forming unit. Furthermore, the printer 300 includes a power supply device 400. The image forming apparatus is not limited to the one illustrated in FIG. 1A but, for example, may be an image forming apparatus including a plurality of image forming units, or may be an image forming apparatus including a primary transfer unit which transfers a toner image on the photoreceptive drum 105 onto an intermediate transfer belt, and a secondary transfer unit which transfers the toner image on the intermediate transfer belt onto a sheet.

The printer 300 includes a controller 320 which controls image forming operation by the image forming unit, conveying operation of sheets, driving operation of the scanner motor 103 of the scanning apparatus 111, and a light amount of the semiconductor laser 100 thereof. The power supply device 400 supplies electric power, for example, to the controller 320. Moreover, the power supply device 400 supplies electric power to one of a motor for rotating the photoreceptive drum 105 and a motor for driving various rollers conveying sheets, and a driving unit such as the scanner motor 103 of the scanning apparatus 111.

[Scanning Apparatus]

Figure 1B:
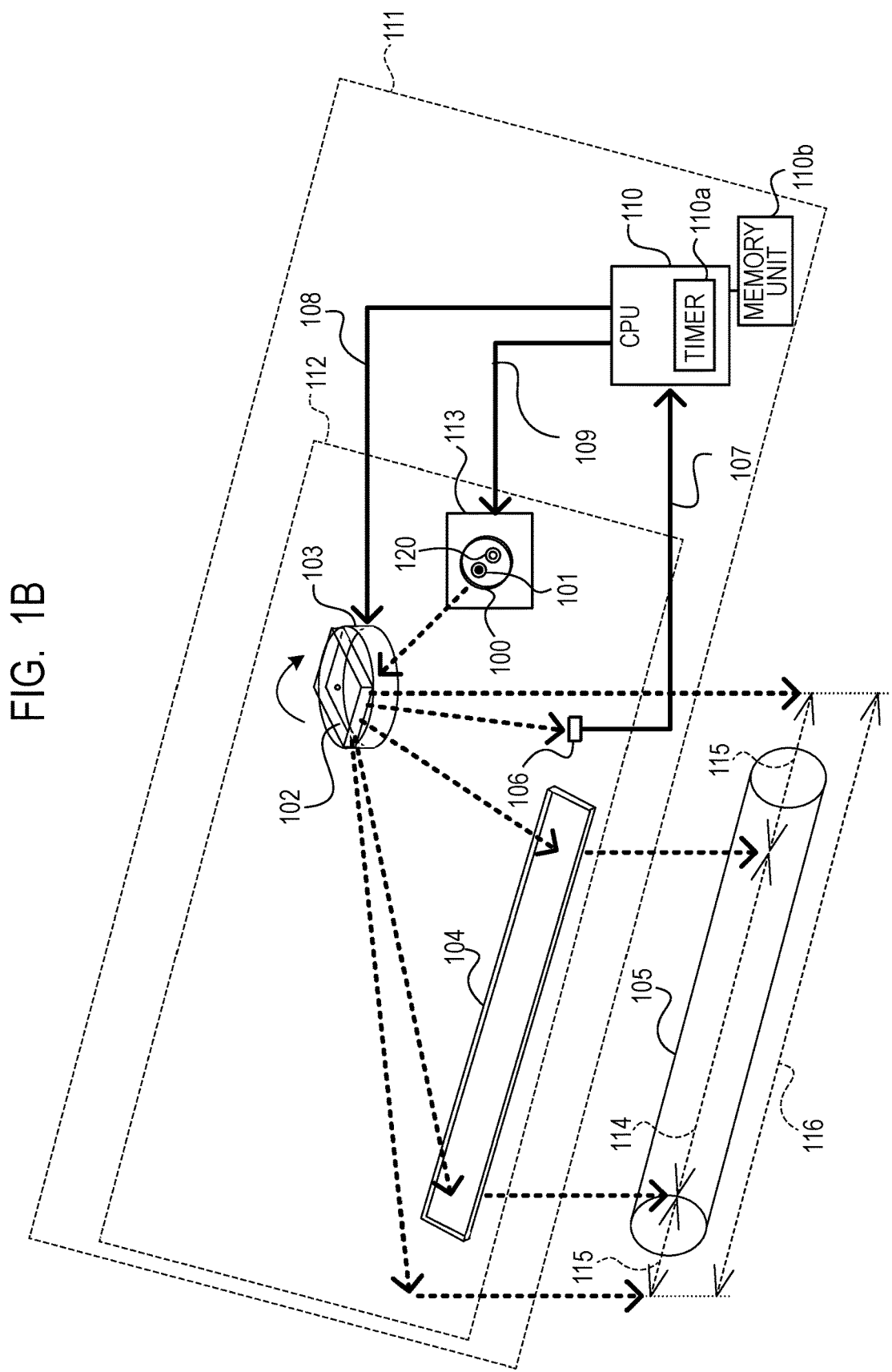
FIG. 1B is a diagram illustrating a schematic configuration of a scanning apparatus.

Next, the scanning apparatus 111 of Embodiment 1 is described. FIG. 1B is a perspective view illustrating a schematic configuration of the scanning apparatus 111 which is an exposing unit common to the embodiments and the laser scanner unit 112 which is its main part. A semiconductor laser 100 is a light source for forming a latent image on the surface of the photoreceptive drum 105, that is, a light source for exposing an image. The semiconductor laser 100 is constituted of one laser diode 101 which is a light emitting device and one photodiode 120 which is a light receiving device, and is controlled by a laser driving circuit 113. Details of control operation of the semiconductor laser 100 by the laser driving circuit 113 are described later. The scanner motor 103 which is a driving unit is exemplarily a rotary driving unit which rotates a rotary polygon mirror 102, and rotates the rotary polygon mirror 102 in the rotational direction illustrated in the figure.

Laser light (light beam) emitted from the semiconductor laser 100 is deflected by rotary operation of the rotary polygon mirror 102 which is a deflection unit, and the deflected laser light is periodically scanned in a predetermined range. Here, the predetermined range for the laser light scanned by rotary operation of the rotary polygon mirror 102 is defined as an all-scanning area 116. An area in which laser light according to image data is scanned out of the all-scanning area 116 in which laser light is scanned by the rotary polygon mirror 102 is defined as an image area 114 which is a first area. An electrostatic latent image formed on the photoreceptive drum 105 is formed in an area, on the photoreceptive drum 105, corresponding to the image area 114. An area except the first area out of the all-scanning area 116 in which laser light is scanned by the rotary polygon mirror 102 is defined as a non-image area 115 which is a second area. The all-scanning area 116 is segmented into the image area 114 and the non-image area 115. The image area 114 denotes an area in which laser light via a reflecting mirror 104 out of laser light reflected on the rotary polygon mirror 102 is radiated onto the surface of the photoreceptive drum 105 which is an image carrier. Meanwhile, the non-image area 115 denotes the area except the image area 114 out of the all-scanning area 116.

A main scanning synchronous sensor 106 which is an output unit is exemplarily a signal generating unit disposed in a predetermined area in the non-image area 115. The main scanning synchronous sensor 106 generates a main scanning synchronous signal 107 when laser light is radiated to the position of the main scanning synchronous sensor 106, that is, in response to the main scanning synchronous sensor 106 receiving the laser light. The main scanning synchronous signal 107 generated by the main scanning synchronous sensor 106 is hereinafter expressed as BD (Beam Detect) signal 107, and a cycle at which the BD signal 107 is generated is expressed as BD cycle. The BD signal 107 is used as a scanning start reference signal for the main scanning direction, and is used for the writing start position in the main scanning direction. The main scanning direction is the direction in which laser light is scanned with the rotary polygon mirror 102 rotating. A CPU 110 which is a control unit functions to sequentially store a BD cycle every time when the BD signal 107 is generated, and controls the scanner motor 103 and the semiconductor laser 100 based on the value of a stored current BD cycle. Namely, the CPU 110 outputs a scanner motor driving signal 108 to the scanner motor 103. The CPU 110 accelerates the scanner motor 103 when a rotation number corresponding to the current BD cycle is lower than a target rotation number which is a set rotation number targeted by the scanner motor 103. The CPU 110 decelerates the scanner motor 103 when the rotation number is higher than the target rotation number. The CPU 110 controls the rotation number of the scanner motor 103 based on the BD signal 107. Thereby, the CPU 110 performs speed control to drive the scanner motor 103 convergently at the target rotation number. The CPU 110 outputs a laser driving signal 109 to the laser driving circuit 113 and controls the semiconductor laser 100 to emit light in the all-scanning area 116 in predetermined timing. The CPU 110 may be included in the aforementioned controller 320 or may be provided independently to the controller 320. The CPU 110 has a timer 110*a* and performs time measurement by the timer 110*a* for determining time elapse. The CPU 110 reads various kinds of information stored in a memory unit 110*b* and performs various kinds of control using the read information.

[Laser Driving Circuit]

Figure 1C:
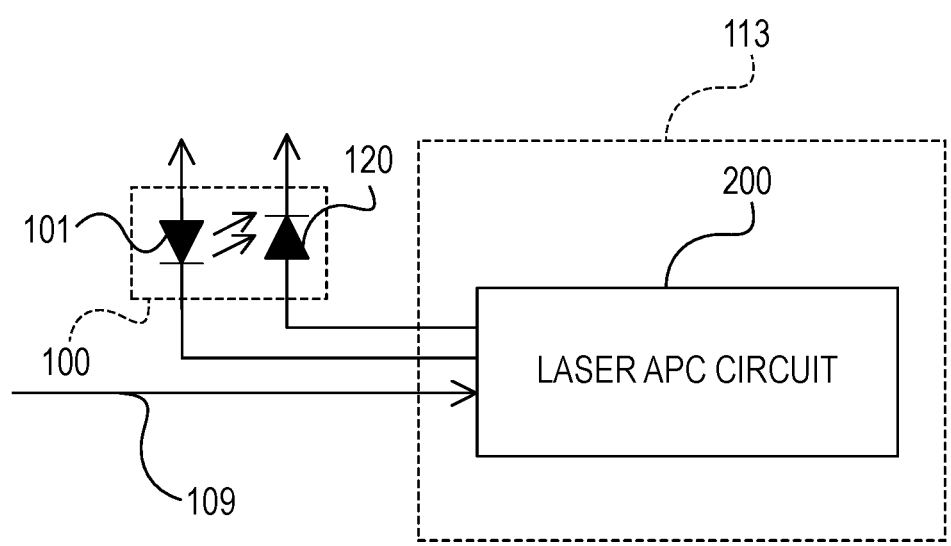
FIG. 1C is a configurational diagram of a laser driving circuit.
Figure 2A:
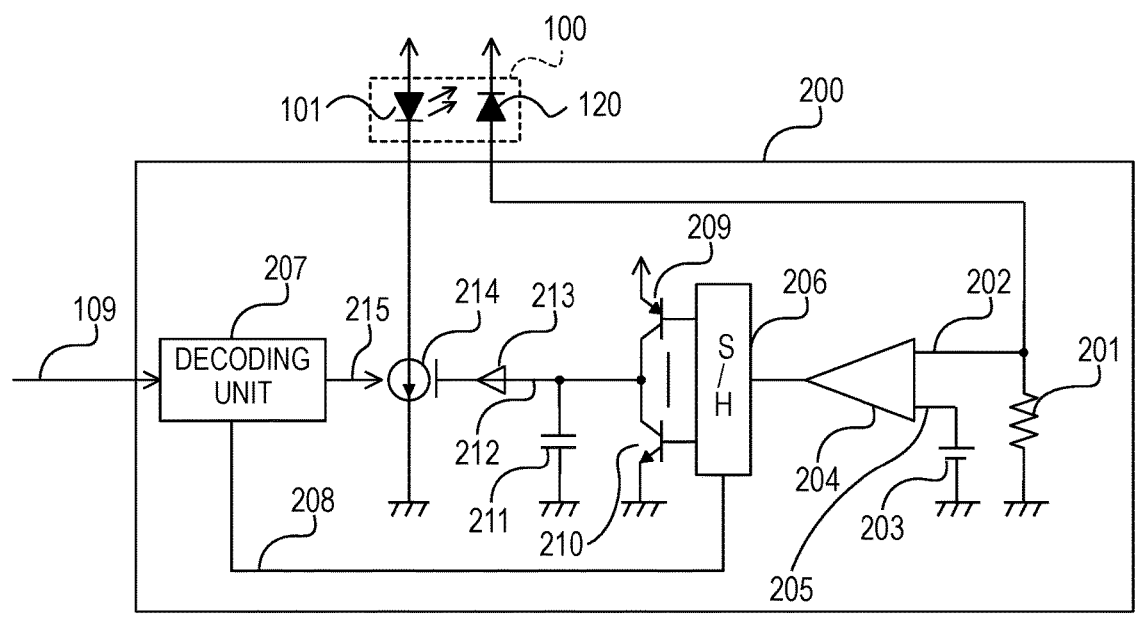
FIG. 2A is a configurational diagram of a laser APC circuit of each of Embodiments 1 to 3.

Next, control operation of the laser driving circuit 113 of Embodiment 1 is described using FIGS. 1C and 2A. FIG. 1C is a configurational diagram of the laser driving circuit 113. The laser driving circuit 113 includes a laser APC circuit 200 for implementing APC (Auto Power Control) operation of stabilizing the light amount of the semiconductor laser 100. There are connected to the laser APC circuit 200 the laser diode 101 and the photodiode 120 constituting the semiconductor laser 100 and the laser driving signal 109 output from the CPU 110.

[APC Operation]

Next, the APC operation of the semiconductor laser 100 is described. FIG. 2A is a configurational diagram of the laser APC circuit 200. The photodiode 120 is a device which monitors the light amount of the laser diode 101, and outputs a current substantially proportional to the light amount of the laser diode 101. The current output from the photodiode 120 flows through a resistor 201. The resistor 201 converts the current into a voltage. A voltage 202 obtained through the conversion by the resistor 201 is input to a comparator 204. Namely, to one input terminal of the comparator 204, the voltage 202 proportional to the light amount of the laser diode 101 is input. To the other input terminal of the comparator 204, a reference voltage 205 output by a reference voltage generating unit 203 is input. The comparator 204 compares the voltage 202 and the reference voltage 205 with each other, and outputs the comparison result to a sampling and holding unit (S/H unit) 206. The sampling and holding unit 206 turns on and turns off a transistor 209 and a transistor 210 according to a sampling and holding timing signal 208 (hereinafter referred to simply as timing signal 208) output from a decoding unit 207 and the output of the comparator 204. Here, the decoding unit 207 decodes the laser driving signal 109 to output the timing signal 208 and an emission control signal 215.

When sampling the light amount of the laser diode 101, the decoding unit 207 causes the laser diode 101 to emit light and informs, with the timing signal 208, the sampling and holding unit 206 of the timing of the sampling. The sampling and holding unit 206 turns on the transistor 209 and turns off the transistor 210 when the voltage 202 proportional to the light amount of the laser diode 101 is lower than the reference voltage 205. Thereby, a holding capacitor 211 is charged and a voltage 212 applied to the holding capacitor 211 rises. Conversely, the sampling and holding unit 206 turns off the transistor 209 and turns on the transistor 210 when the voltage 202 proportional to the light amount of the laser diode 101 is equal to or more than the reference voltage 205. Thereby, the holding capacitor 211 is discharged and the voltage 212 applied to the holding capacitor 211 falls. The voltage 212 applied to the holding capacitor 211 is buffered by a buffer 213 to control a current of a constant current source 214. Thus, the current flowing through the laser diode 101 is made proportional to the voltage 212 applied to the holding capacitor 211, and the current flowing through the laser diode 101 is larger as the voltage 212 applied to the holding capacitor 211 is larger. Further, the constant current source 214 turns on and turns off the current flowing through the laser diode 101 with the emission control signal 215 output from the decoding unit 207.

In sampling, by the operation above, the light amount of the laser diode 101 is adjusted to be the light amount determined by the resistance value of the resistor 201 that causes the voltage 202 proportional to the light amount of the laser diode 101 and the reference voltage 205. In the holding state, the sampling and holding unit 206 holds the voltage 212 applied to the holding capacitor 211 by turning off both the transistor 209 and the transistor 210 to maintain the light amount of the laser diode 101 to be constant. In this view point, the voltage 212 is also referred to as holding capacitor voltage 212.

[Control in Activation of Scanning Apparatus]

Figure 2B:
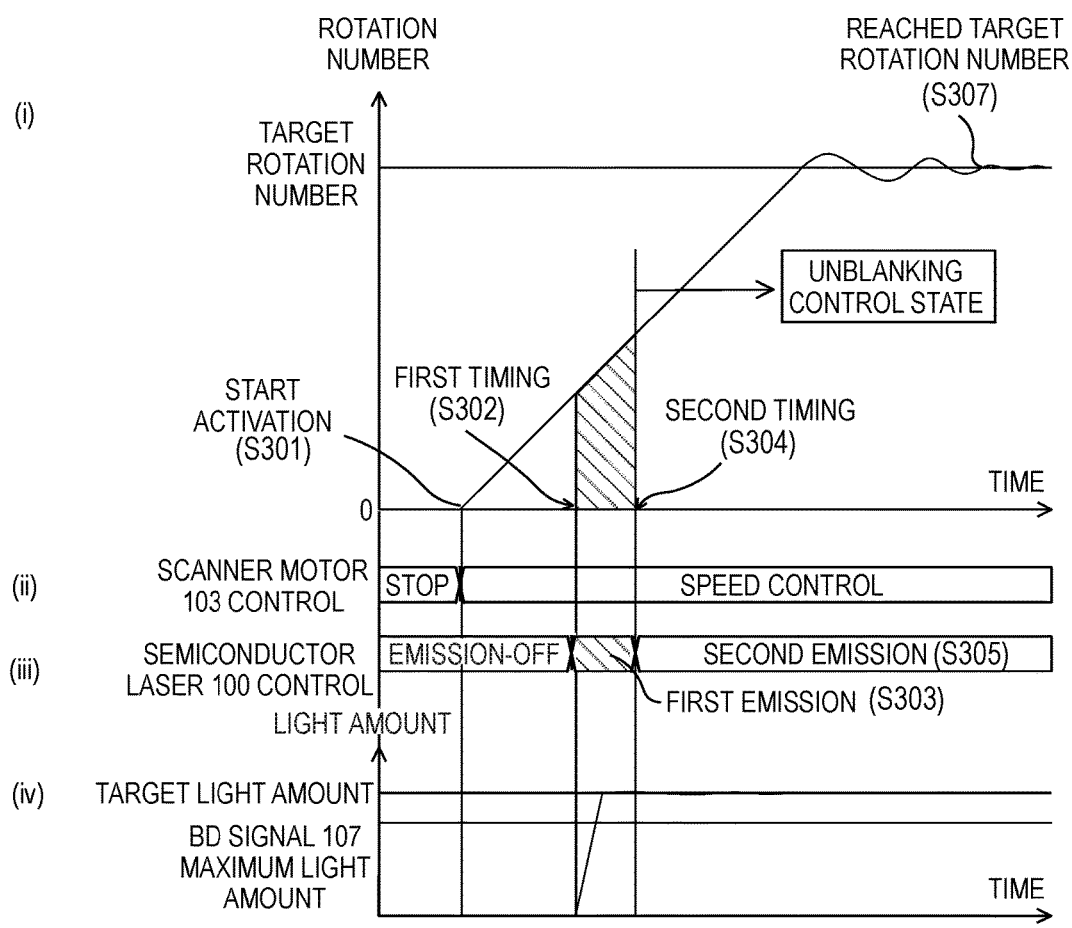
FIG. 2B is a diagram illustrating change of a rotation number of a scanner motor of Embodiment 1.

Next, control in activation of the scanning apparatus 111 of Embodiment 1 is described using FIGS. 2B, 3, 4A and 4B. FIG. 2B(i) is a characteristic chart illustrating change of the rotation number after activation of the scanner motor 103 is started, where the horizontal axis denotes time, the vertical axis denotes the rotation number of the scanner motor 103, and the broken line denotes a rotation number targeted for the scanner motor 103 (target rotation number). FIG. 2B(ii) illustrates the control state (stop, and speed control) of the scanner motor 103 controlled by the CPU 110. FIG. 2B(iii) illustrates the control state (emission-off, first emission, and second emission) of the semiconductor laser 100. The first emission state is a state where laser light is radiated in the all-scanning area 116 (the image area 114 and the non-image area 115) by the time when the rotation number of the scanner motor 103 reaches the target rotation number after activation of the scanner motor 103 is started. The second emission state is a state where laser light is radiated in the non-image area 115 by the time when the rotation number of the scanner motor 103 reaches the target rotation number after activation of the scanner motor 103 is started. Notably, signs beginning with "S" in the figures denote step numbers in a flowchart of FIG. 3 mentioned later. FIG. 2B(iv) illustrates the light amount of the semiconductor laser 100, where the horizontal axis denotes time, and the vertical axis denotes the light amount of the semiconductor laser 100. Here, the light amount of the semiconductor laser 100 at which the main scanning synchronous sensor 106 can receive laser light to output the BD signal 107, and the target light amount are indicated by broken lines.

Figure 3:
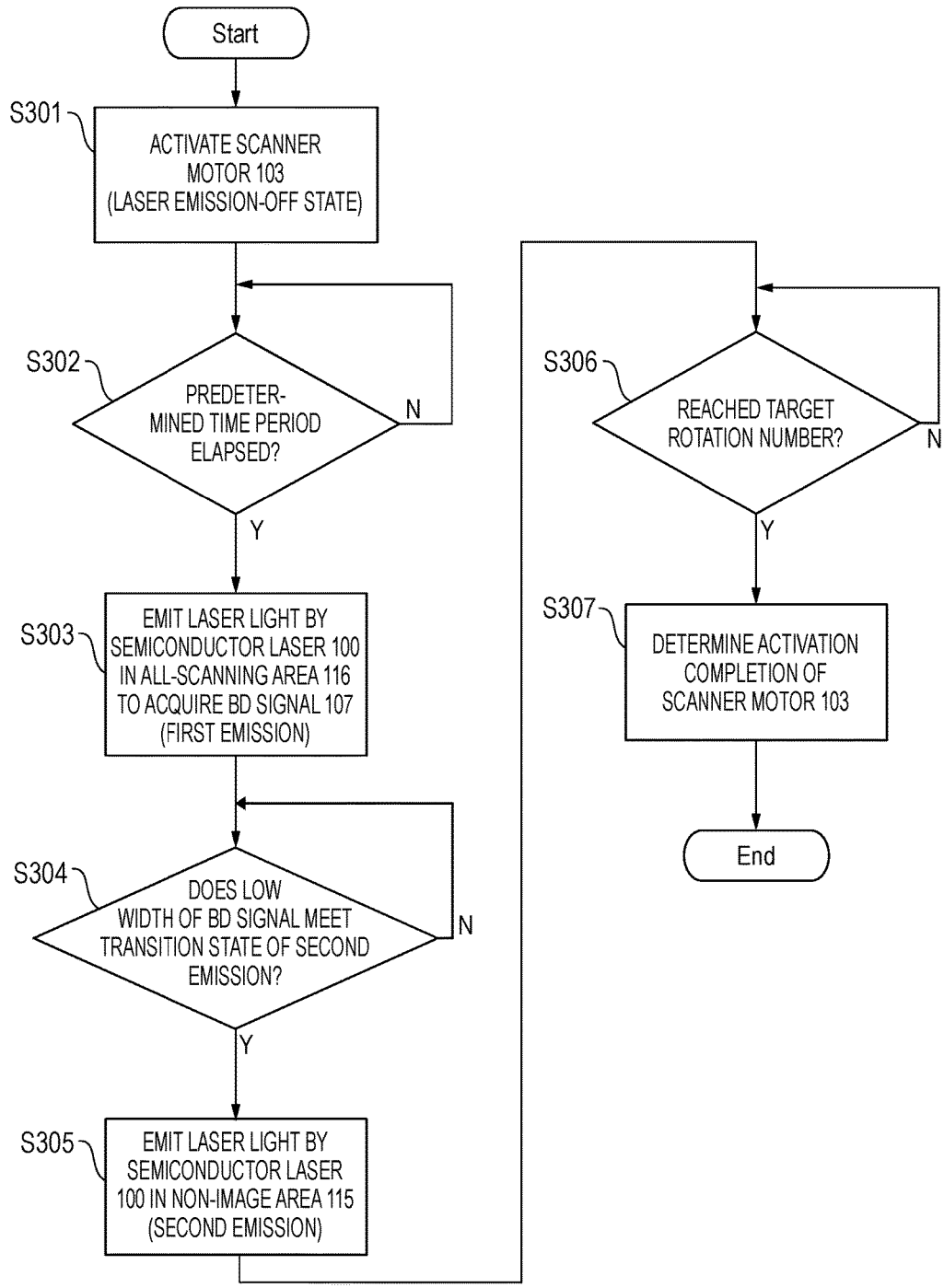
FIG. 3 is a flowchart illustrating activation control of a scanning apparatus of Embodiment 1.

FIG. 3 is a flowchart illustrating control in activation of the scanning apparatus 111. When the printer 300 is first instructed to start printing from one of an external apparatus (not shown) and an operation unit (not shown), the CPU 110 starts processing in and after step 301 (hereafter S301) in predetermined timing after the instruction of printing is generated. Namely, the CPU 110 starts activation control of the scanner motor 103 with the scanner motor driving signal 108 and activation control of the semiconductor laser 100. Before the start of activation of the scanner motor 103, the scanner motor 103 is stopped (FIG. 2B(ii)) and the semiconductor laser 100 is in the emission-off state (FIG. 2B(iii)).

In S301, the CPU 110 outputs the scanner motor driving signal 108 to activate the scanner motor 103. Here, the scanner motor 103 operates with the set target rotation number, and a speed control instruction by the CPU 110, and the rotary polygon mirror 102 also starts to rotate with the scanner motor 103 rotating. In this stage, the CPU 110 controls the semiconductor laser 100 to be in the emission-off state (FIG. 2B(iii)), and the BD signal 107 is not generated by the main scanning synchronous sensor 106 (FIG. 4A(i) and FIG. 4B(i) mentioned later). Therefore, the CPU 110 instructs the scanner motor 103 to accelerate. Moreover, the CPU 110 resets and starts the timer 110a.

In S302, the CPU 110 refers to the timer 110a to determine whether or not a predetermined time period elapses. When it is determined that the predetermined time period does not elapse in S302, the CPU 110 returns the process to S302. When it is determined that the predetermined time period elapses, that is, first timing is determined in S302, the CPU 110 puts the process forward to S303. In S303, the CPU 110 causes, in the first timing, the semiconductor laser 100 to emit light over the all-scanning area 116 of the scanning apparatus 111. Hereinafter, operation to cause, in the first timing, the semiconductor laser 100 to emit light over the all-scanning area 116 of the scanning apparatus 111 is referred to as the first emission (FIG. 2A(iii) and FIG. 2B(iii)).

In the APC operation with the first emission, the main scanning synchronous sensor 106 starts to generate the BD signal 107 when the light amount of the semiconductor laser 100 reaches a light amount equal to or more than the light amount at which the main scanning synchronous sensor 106 can output the BD signal 107. When the semiconductor laser 100 starts to be turned on, the holding capacitor voltage 212 applied to the holding capacitor 211 of the laser APC circuit 200 starts with 0 V. Therefore, it takes time for the holding capacitor 211 to be charged up to a predetermined voltage. Since the current flowing through the laser diode 101 is proportional to the holding capacitor voltage 212, the rising speed of the light amount of the semiconductor laser 100 is determined depending on a time constant based on the capacity of the holding capacitor 211 and a charge supply speed from the sampling and holding unit 206.

When detecting the BD signal 107 output from the main scanning synchronous sensor 106, the CPU 110 sequentially stores the value of a cycle of the BD signal 107 (hereinafter referred to as BD cycle value) and a low width of the BD signal 107 which are determined based on the BD signal 107 in the memory unit 110b. Here, the BD cycle value is a time period, for example, from the fall of a BD signal 107 to the fall of the next BD signal 107. Continuous two BD signals 107 are needed to obtain the BD cycle value. For example, the CPU 110 sets a BD cycle value obtained from a first input BD signal 107 (first signal) and the next input BD signal 107 (second signal) to be $P_1$. Succeeding BD cycle values are respectively set to be $P_2$, $P_3$ ..., $P_n$, ... (n is a positive integer). The CPU 110 stores the BD cycle values $P_1$, $P_2$ ..., $P_n$, ... in the memory unit 110b.

The low width of the BD signal 107 (width of the signal) is a time period from the fall of a BD signal 107 to the rise of the same, and a width (time width) within which the BD signal 107 is at a low level. Hereafter, the low width of the BD signal 107 is denoted as T_bdw, and low widths stored by the CPU 110 since the CPU 110 receives the first BD signal 107 from the main scanning synchronous sensor 106 are sequentially denoted as T_bdw1, T_bdw2, T_bdwn, ... (n is a positive integer). The CPU 110 stores the BD cycle values $P_n$ and the low widths T_bdwn in the memory unit 110b. The suffix n is occasionally omitted when the BD signal 107 is not specified.

In S304, the CPU 110 determines whether or not the BD cycle value $P_n$ and the low width T_bdwn of the BD signal 107 meet a condition (hereinafter referred to as transition condition) for transition of control of the semiconductor laser 100 from the first emission to the second emission.

When it is determined that they do not meet the transition condition in S304, the CPU 110 returns the process to S304, and when it is determined that they meet the transition condition in S304, the CPU 110 puts the process forward to S305. In S305, the CPU 110 performs transition of control of the semiconductor laser 100 to the second emission. Namely, the CPU 110 causes the semiconductor laser 100 to emit light in the non-image area 115. Timing when the CPU 110 determines to meet the transition condition and performs transition of control of the semiconductor laser 100 to the second emission is second timing. The transition condition is described later.

In the second emission, the CPU 110 performs unblanking control of emission only in the non-image area 115. The CPU 110 calculates a time period (P×D) obtained by multiplying a BD cycle value P last updated from timing when a BD signal 107 is last acquired by a preset setting value D [%]. The CPU 110 causes the semiconductor laser 100 to emit light in timing when the calculated time period (P×D) elapses in order to acquire the next BD signal 107. After causing the semiconductor laser 100 to emit light and acquiring the BD signal 107 from the main scanning synchronous sensor 106, the CPU 110 turns off the emission of the semiconductor laser 100, and calculates the next emission timing from the BD cycle value P updated for acquiring the next BD signal. The CPU 110 performs the unblanking control of emission only in the non-image area 115 by the operation as above.

Here, since through the speed control by the CPU 110, the scanner motor 103 is still being accelerated toward the target rotation number, the BD cycle is gradually shortening. Nevertheless, a change rate between adjacent BD cycle values is getting further smaller in the second emission state than in the first emission state. Therefore, emission timing in the next scanning is determined from the previously stored BD cycle value, and emission control to cause the semiconductor laser 100 to emit light in the non-image area 115 and to acquire the next BD signal 107 is continued. Namely, the setting value D [%] is supposed to be set based on timing of causing the semiconductor laser 100 to emit light in the non-image area 115 and acquiring the next BD signal 107.

In S306, the CPU 110 determines whether or not the rotation number of the scanner motor 103 reaches the target rotation number. For example, the CPU 110 determines whether or not the rotation number of the scanner motor 103 reaches the target rotation number based on whether or not the rotation number corresponding the current BD cycle attains 1% or less of difference from the target rotation number. When it is determined that the rotation number of the scanner motor 103 does not reach the target rotation number in S306, the CPU 110 returns the process to S306, and when it is determined that to reach the target rotation number, CPU 110 puts the process forward to S307. In S307, the CPU 110 determines the activation completion of the scanner motor 103 and ends the process. As above, in Embodiment 1, the semiconductor laser 100 is stabilized to attain the light amount needed for forming an image through the APC operation with emission for acquiring the BD signals 107, by the time of the activation completion of the scanner motor 103.

[Condition for Transition from First Emission to Second Emission]

Figure 4B:
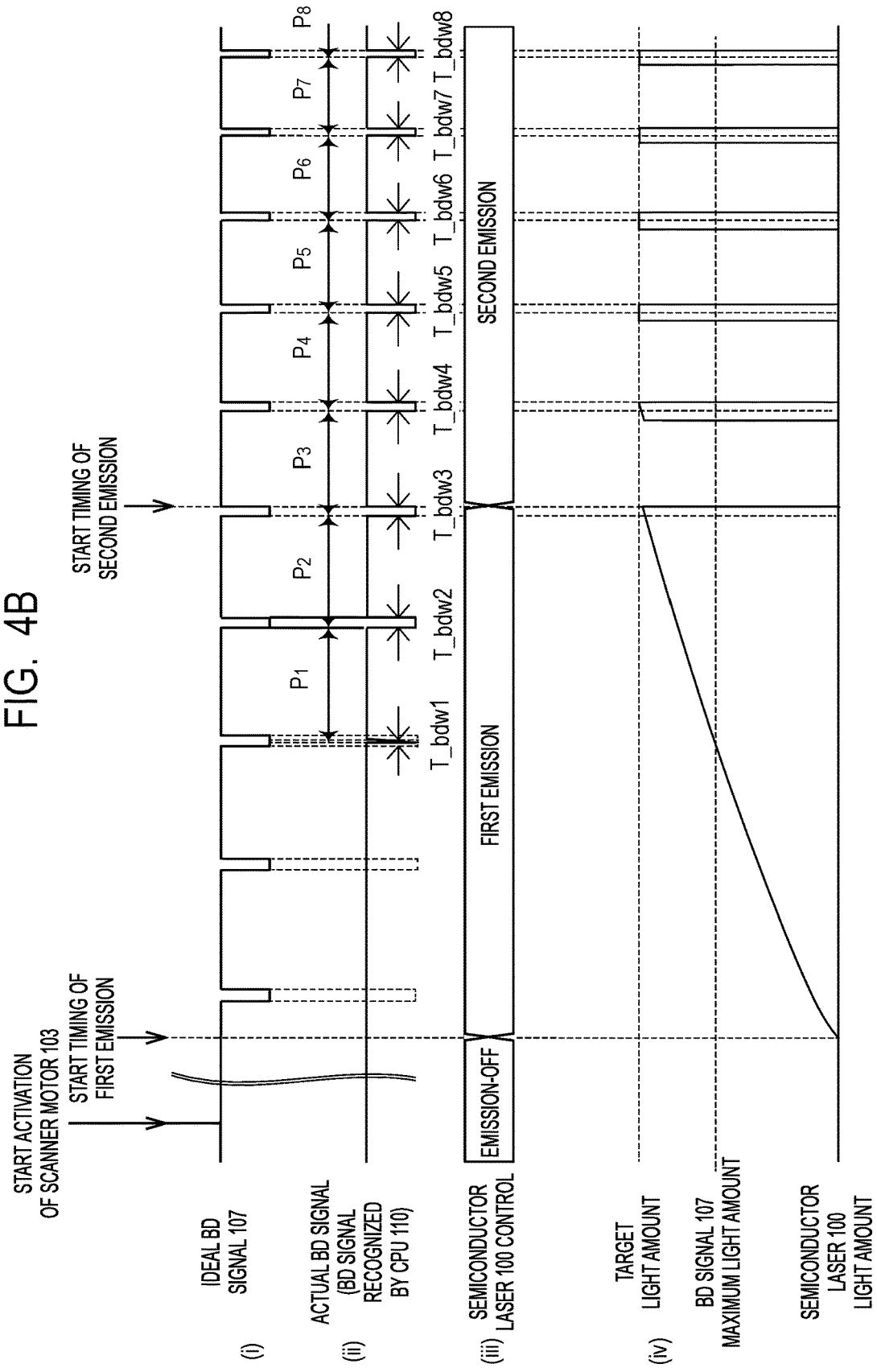

Using FIGS. 4A and 4B, there are described a determination method and control in transition from the first emission to the second emission as the process in S304 of the flowchart in FIG. 3. FIGS. 4A and 4B illustrate timing charts for describing activation control of the scanning apparatus 111. In each of FIGS. 4A and 4B, portion (i) illustrates an ideal BD signal 107 to be output to the CPU 110 from the main scanning synchronous sensor 106. Portion (ii) illustrates an actual BD signal 107 output to the CPU 110 from the main scanning synchronous sensor 106, namely illustrating a BD signal 107 recognized by the CPU 110 through its input from the main scanning synchronous sensor 106. Portion (iii) illustrates the emission state (first emission, second emission and the like) of the semiconductor laser 100. Similarly to FIG. 2B(iv), portion (iv) illustrates the light amount of the semiconductor laser 100. Here, the light amount of the semiconductor laser 100 at which the main scanning synchronous sensor 106 can output the BD signal 107, and the target light amount are indicated by broken lines.

The main scanning synchronous sensor 106 outputs the BD signal 107 at a high level when the light amount of laser light is less than a predetermined light amount. The main scanning synchronous sensor 106 outputs the BD signal 107 at a low level when it is receiving laser light the light amount of which is equal to or more than the predetermined light amount. The CPU 110 stores a BD cycle value ($P_1$ or the like) from the fall of a BD signal 107 to the fall of the next BD signal 107 in the memory unit 110b. In order to clearly describe the features of Embodiment 1, FIG. 4A illustrates control according to a conventional example, and FIG. 4B illustrates control according to Embodiment 1. In FIGS. 4A and 4B, the start of activation of the scanner motor 103 and the first timing when the first emission is started (hereinafter also referred to as start timing of first emission) are the same as those in FIG. 2B.

As illustrated in FIG. 4A, in the conventional example, after causing the semiconductor laser 100 to emit light with the first emission, the CPU 110 performs transition to the second emission in predetermined timing. Specifically, the CPU 110 performs such transition from the first emission to the second emission in timing of acquiring the BD signals 107 at least twice after the elapse of a time period (hereinafter referred to as rise waiting time period Twait) after the elapse of a predetermined time period from the rise of the light amount of the semiconductor laser 100 up to the target light amount from the start of emission of the semiconductor laser 100. Notably, the second timing when the second emission is started is also referred to as start timing of second emission. The CPU 110 can obtain the BD cycle value P if the BD signals 107 are continuously acquired at least twice. In the case of such a conventional control scheme, the low width of the BD signal 107 is not observed as in Embodiment 1.

The rise waiting time period Twait is a waiting time period for the rise of the light amount of the semiconductor laser 100 up to the light amount at which the main scanning synchronous sensor 106 can stably output the BD signal 107, and is set as a fixed value. The rise waiting time period Twait is set, taking account of variation in capacity of the holding capacitor 211 of the laser APC circuit 200, variation in charge supply speed from the sampling and holding unit 206, and the like. For example, the rise waiting time period Twait is set to be slightly longer than an actual time period by the time when the light amount of the semiconductor laser 100 reaches the target light amount (longer by the aforementioned predetermined time period).

As illustrated in FIG. 4B, in Embodiment 1, after causing the semiconductor laser 100 to emit light with the first emission, when detecting the BD signal 107, the CPU 110 sequentially stores the BD cycle value Pn and the low width T_bdwn of the BD signal 107 in the memory unit 110b.

Then, the CPU 110 performs transition from the first emission to the second emission in timing of acquiring the BD signal 107 having a low width equal to or more than a predetermined time width A at least once or more. Namely, the aforementioned transition condition is that the low width of the BD signal 107 is, at least once or more, equal to or more than the predetermined time width A.

In the example of FIG. 4B, the CPU 110 determines that the low width T_bdw1 of the BD signal first acquired when the light amount of the semiconductor laser 100 rises is less than the predetermined time width A (T_bdw1<A). The CPU 110 determines that both the low widths T_bdw2 and T_bdw3 of the BD signals 107 subsequently acquired are equal to or more than the predetermined time width A (T_bdw2≥A; T_bdw3≥A). The CPU 110 starts the second emission after acquiring the low width T_bdw3 of the BD signal 107. The predetermined time width A is determined by expression (1).

$$\text{Predetermined time width } A = T\_bdws \times (Ps0/Ps1) \times E1 \tag{1}$$

T_bdws: Low width of the BD signal 107 in steady rotation

Ps0: BD cycle value predicted from the rotation number of the scanner motor 103 in the start timing of first emission Ps1: BD cycle value obtained from the rotation number of the scanner motor 103 in steady rotation E1: Coefficient Ps0, Ps1 and E1 are set to be arbitrary fixed values based on experimental data. Ps0 is determined based on activation characteristics of the scanner motor 103, and is set to be a BD cycle value at the highest rotational speed supposed after a predetermined time period elapses from the start of activation control. The coefficient E1 is set to be a value smaller than one (E1<1). T_bdws is set to be one of a fixed value and a value updated as needed using the low width of the BD signal 107 acquired in steady rotation of the scanner motor 103 after the rotation number of the scanner motor 103 actually becomes the target rotation number. The feature of the predetermined time width A is that the predetermined time width A is longer than the minimum low width, of the BD signal 107, which is acquired for acquiring the BD cycle in steady rotation of the scanner motor 103. As illustrated in FIG. 4B, it is apparent that the start timing of second emission is earlier than the start timing of second emission in FIG. 4A. The fixed value is supposed to be stored in advance in the memory unit 110b or the like.

By using the aforementioned configuration and control method, the CPU 110 determines that the low width of the BD signal 107 is equal to or more than a predetermined width in activation of the scanning apparatus 111. Thereby, switching to the second emission to emit light only in the non-image area 115 is performed after the light amount of the semiconductor laser 100 becomes equal to or more than the light amount at which the main scanning synchronous sensor 106 can output the BD signal 107. Since switching to the second emission is performed after the light amount of the semiconductor laser 100 becomes equal to or more than the light amount at which the main scanning synchronous sensor 106 can output the BD signal 107, the BD cycle is not misrecognized. Moreover, there can be suppressed, to be short, the time period of the first emission when laser light is unnecessarily radiated onto the photoreceptive drum 105, and abrasion of the photoreceptive drum 105 can be prevented.

As above, according to Embodiment 1, there can be further shortened a time period when laser is radiated in the whole area on a photosensitive member in activation of a scanning apparatus.

Embodiment 2

Figure 5:
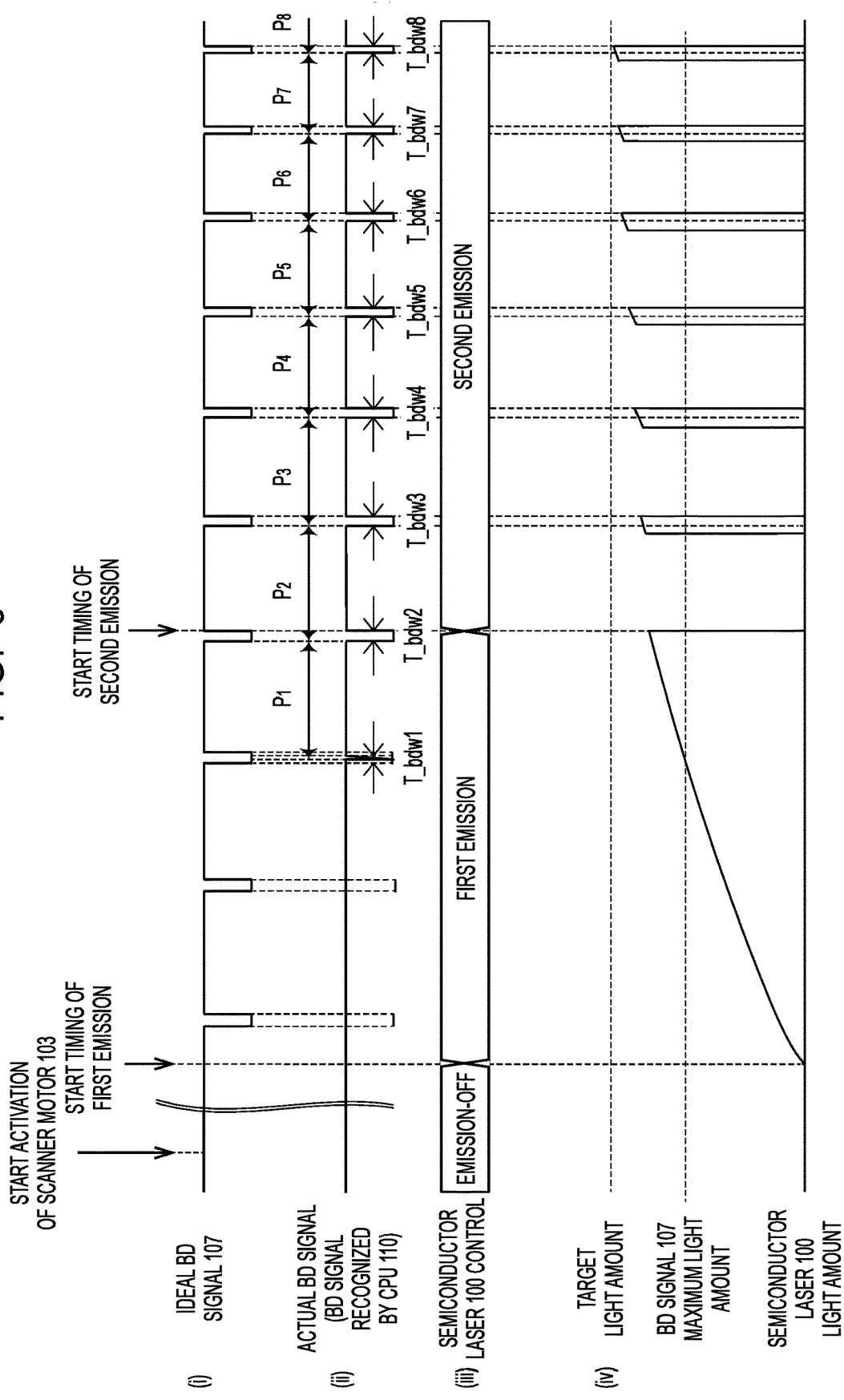
FIG. 5 is a timing chart illustrating activation control of a scanning apparatus of Embodiment 2.

An image forming apparatus of Embodiment 2 is described. Components equivalent to those in Embodiment 1 are given the same signs and their description is omitted. Embodiment 2 is different from Embodiment 1 in transition condition used for determination in S304 of the flowchart in FIG. 3. FIG. 5 is a timing chart illustrating activation control of the scanning apparatus 111 of Embodiment 2. Portions (i) to (iv) in FIG. 5 correspond to those in FIG. 4B and their definitions are omitted. As illustrated in FIG. 5, in Embodiment 2, after causing the semiconductor laser 100 to emit light with the first emission, when detecting the BD signal 107, the CPU 110 sequentially stores the BD cycle value Pn and the low width T_bdwn of the BD signal 107 in the memory unit 110b. Then, the CPU 110 determines whether or not the BD cycle value Pn and the low width T_bdwn that are last acquired meet the transition condition, in timing of acquiring the BD signals 107 at least twice or more, in other words, in timing of acquiring the BD cycle value P at least one or more. The determination on the transition condition by the CPU 110 is determination on whether or not the low width T_bdwn of the BD signal 107 is included within a predetermined range. Specifically, the CPU 110 determines whether or not the relation of expression (2) below is completed.

$$T\_bdws \times (Pn/Ps1) \times E2 \leq T\_bdwn \leq T\_bdws \times (Pn/Ps1) \times E3 \tag{2}$$

T_bdws: Low width of the BD signal 107 in steady rotation

T_bdwn: Low width of the BD signal 107 nth acquired from the start of activation control Pn: Distance (BD cycle value) between the BD signal nth acquired and the BD signal 107 previously ((n−1)th) acquired from the start of control Ps1: BD cycle value obtained from the rotation number of the scanner motor 103 in steady rotation E2: Coefficient E3: Coefficient Ps1, E2 and E3 are set to be arbitrary fixed values based on experimental data. The coefficient E2 is set to be a value smaller than one (E2<1). The coefficient E3 is set to be a value larger than one (E3>1). T_bdws is set to be one of a fixed value and a value updated as needed using the low width of the BD signal 107 acquired in steady rotation of the scanner motor 103 after the rotation number of the scanner motor 103 actually becomes the target rotation number. The fixed value is supposed to be stored in advance in the memory unit 110b or the like.

When the relation of expression (2) is completed on the BD cycle value Pn and the low width T_bdwn which are last acquired, the CPU 110 starts the second emission after acquiring the BD signal 107. When the relation of expression (2) is not completed on the BD cycle value Pn and the low width T_bdwn which are last acquired, the CPU 110 continues the first emission, acquires the next BD cycle value Pn and low width T_bdwn, and determines whether or not the relation of expression (2) is completed. In FIG. 5, expression (2) is not completed on the first acquired low width T_bdw1. Then, expression (2) is completed on the second acquired low width T_bdw2, and the CPU 110 performs transition of control of the semiconductor laser 100 from the first emission state to the second emission state.

When the light amount of the semiconductor laser 100 is a value close to the light amount at which the main scanning synchronous sensor 106 can output the BD signal 107, the low width T_bdw of the BD signal 107 is acquired to be shorter than the width expected for the BD signal 107. Therefore, the BD signal 107 is difficult to be discriminated from a noise component. In general, the BD signal 107 that is shorter in low width than a predetermined one is not used for control. Nevertheless, the feature of Embodiment 2 is that even the BD signal 107 that is shorter in low width than the predetermined one is used for control when it meets the transition condition by separating the BD signal 107 from noise based on relation between the low width T_bdw of the BD signal 107 that is next or later acquired and the BD cycle value P. Such control can more shorten a time period for the first emission in activation of the scanning apparatus 111 than control not using the BD signal 107 the low width of which is shorter than a predetermined width. By using the aforementioned configuration and control method, there can be suppressed, to be shorter, the time period of the first emission when laser is unnecessarily radiated onto the photoreceptive drum 105 in activation of the scanning apparatus 111.

As above, according to Embodiment 2, there can be further shortened a time period when laser is radiated in the whole area on a photosensitive member in activation of a scanning apparatus.

Embodiment 3

Figure 6:
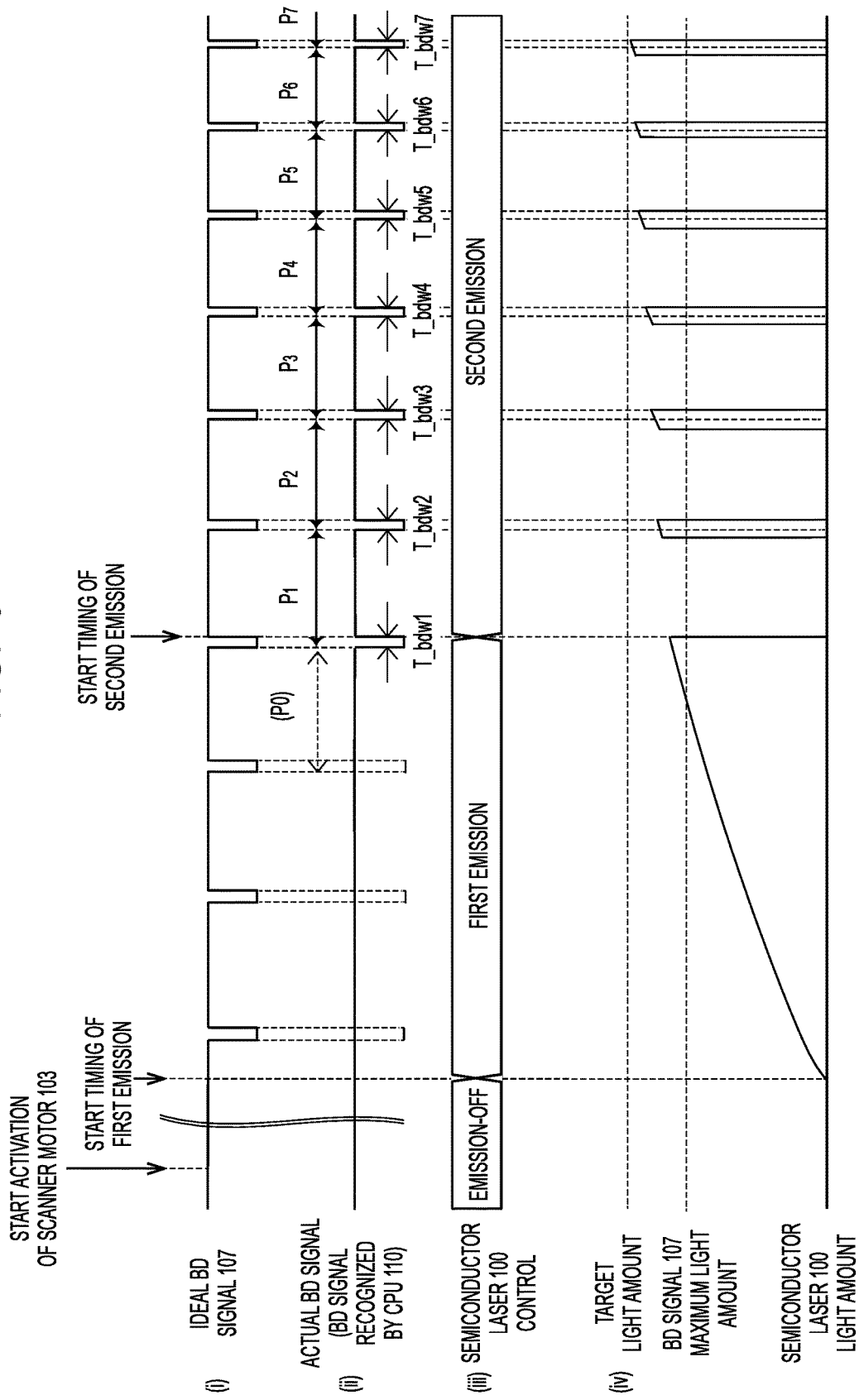
FIG. 6 is a timing chart illustrating activation control of a scanning apparatus of Embodiment 3.

An image forming apparatus of Embodiment 3 is described. Components equivalent to those in Embodiments 1 and 2 are given the same signs and their description is omitted. FIG. 6 is a timing chart illustrating activation control of the scanning apparatus 111 of Embodiment 3. Portions (i) to (iv) in FIG. 6 correspond to those in FIG. 4B and their definitions are omitted. As illustrated in FIG. 6, after causing the semiconductor laser 100 to emit light with the first emission, when detecting the BD signal 107, the CPU 110 sequentially stores the BD cycle value Pn and the low width T_bdwn of the BD signal 107 in the memory unit 110b. Then, the CPU 110 determines whether or not the low width T_bdw1 of the first acquired BD signal 107 meets the transition condition described for Embodiment 1, namely, is equal to or more than the predetermined time width A. When the low width T_bdw1 of the first acquired BD signal 107 is less than the predetermined time width A, the CPU 110 acquires the next BD signal 107 while continuing the first emission to perform the activation control described for Embodiments 1 and 2.

When it is determined that the low width T_bdw1 of the first acquired BD signal 107 is equal to or more than the predetermined time width A, the CPU 110 performs transition of the second emission immediately after the first BD signal 107 is acquired. Since there is no information of the BD cycle value Pn immediately after the transition to the second emission, the CPU 110 calculates a BD cycle value P0 based on expression (3) below and performs the control. The BD cycle value P0 calculated from expression (3) in the state of no information of the BD cycle value P is hereinafter referred to as predicted BD cycle value P0.

$$\text{Predicted BD cycle value } P0 = T\_bdws/T\_bdwn \times Ps1 \times E4 \quad (3)$$

T_bdws: Low width of the BD signal 107 in steady rotation

T_bdwn: Low width of the BD signal 107 nth acquired from the start of activation control (n=1)

Ps1: BD cycle value obtained from the rotation number of the scanner motor 103 in steady rotation E4: Coefficient Ps1 and E4 are set to be arbitrary fixed values based on experimental data. The coefficient E4 is set to be a value smaller than one (E4<1). T_bdws is set to be one of a fixed value and a value updated as needed using the low width of the BD signal 107 acquired in steady rotation of the scanner motor 103 after the rotation number of the scanner motor 103 actually becomes the target rotation number. The fixed value is supposed to be stored in advance in the memory unit 110b or the like.

In Embodiments 1 and 2, the CPU 110 performs transition to the second emission after acquiring the BD signals 107 at least twice or more. In Embodiment 3, when the low width T_bdw1 of the first acquired BD signal 107 is equal to or more than the predetermined time width A, the CPU 110 predicts the BD cycle value ($P_0$) from the low width T_bdw1 of the acquired BD signal 107. Thus, the feature of Embodiment 3 is transition to the second emission immediately after the first BD signal 107 is acquired. By using the aforementioned configuration and control method, there can be suppressed, to be shorter, the time period of the first emission when laser light is unnecessarily radiated onto the photoreceptive drum 105 in activation of the scanning apparatus 111.

As above, according to Embodiment 3, there can be further shortened a time period when laser is radiated in the whole area on a photosensitive member in activation of a scanning apparatus.

According to the present invention, there can be further shortened a time period when laser is radiated in the whole area on a photosensitive member in activation of a scanning apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-217947, filed Nov. 13, 2017, which is hereby incorporated by reference herein in its entirety.

What is claimed is:

1. A scanning apparatus comprising:
   a light source;
   a deflection unit configured to deflect and scan light emitted from the light source;
   an output unit configured to receive light scanned in a second area different from a first area in which light according to image data is scanned, in an area in which the deflection unit scans the light, and output a signal according to a light amount; and
   a control unit configured to control an emission state of the light source to perform switching between a first emission state in which light source emits light to scan the light in the first area and the second area and a second emission state in which the light source emits light to scan the light in the second area,
   wherein the output unit outputs a signal of a first value according to a light amount in a case where the light received by the output unit has a first light amount and outputs a second value according to a light amount in a case where the light received by the output unit has a second light amount larger than the first light amount, and the control unit controls the emission state of the light source to perform switching from the first emission state to the second emission state in a case where an output time period of a signal of the second value corresponding to the second light amount is equal to or more than a predetermined time period.

2. A scanning apparatus according to claim 1, comprising a driving unit configured to drive the deflection unit,
wherein the control unit controls switching from the first emission state to the second emission state by a time when a rotation number of the driving unit reaches a target rotation number after activation of the driving unit is started.

3. A scanning apparatus according to claim 2, wherein the control unit controls switching from the first emission state to the second emission state based on timing of acquiring a signal of one second value output by the output unit in a case where an output time period of the signal of the one second value output by the output unit is equal to or more than the predetermined time period in the first emission state.

4. A scanning apparatus according to claim 3, wherein the control unit predicts a cycle at which the second value is output in and after the timing of acquiring the signal of the one second value output by the output unit based on an output time period of the signal of the second value after the rotation number of the driving unit reaches the target rotation number, a cycle at which the signal of the second value is output after the rotation number of the driving unit reaches the target rotation number, and the output time period of the signal of the one second value output by the output unit.

5. A scanning apparatus according to claim 2, wherein the predetermined time period is determined based on a predefined output time period of a signal of the second value after the rotation number of the driving unit reaches the target rotation number, a predefined cycle at which the second value is output after the rotation number of the driving unit reaches the target rotation number, and a cycle at which the second value is output and which is based on the output time period of the signal of the second value output in the first emission state.

6. A scanning apparatus according to claim 3, wherein the predetermined time period is determined based on a predefined output time period of a signal of the second value after the rotation number of the driving unit reaches the target rotation number, a predefined cycle at which the second value is output after the rotation number of the driving unit reaches the target rotation number, and a cycle at which the second value is assumed to be output when the first emission state is started and which is determined based on a characteristic in activation of the driving unit.

7. A scanning apparatus according to claim 1, wherein the control unit performs switching from the first emission state to the second emission state when the output time period of the signal of the second value is equal to or more than the predetermined time period and is not more than a second predetermined time period longer than the predetermined time period in the first emission state.

8. A scanning apparatus according to claim 7, comprising a driving unit configured to drive the deflection unit,
wherein the second predetermined time period is determined based on an output time period of a signal of the second value after the rotation number of the driving unit reaches the target rotation number, a cycle at which the second value is output after the rotation number of the driving unit reaches the target rotation number, and a cycle at which the second value is output and which is based on the output time period of the signal of the second value output by the output unit in the first emission state.

9. A scanning apparatus according to claim 1, wherein the output unit outputs a signal at a high level as the first value when a light amount of a light beam is less than a predetermined light amount, and outputs a signal at a low level as the second value when the light amount of the light beam is equal to or more than the predetermined light amount, and
wherein the output time period of the signal of the second value is a time period when the signal at the low level is output.

10. A scanning apparatus according to claim 1, wherein the control unit controls the light source to emit light and sets the light source to be in the first emission state in timing when the predetermined time period elapses after the driving unit starts to rotate.

11. A scanning apparatus according to claim 1, comprising a light receiving device configured to receive a light beam radiated from the light source,
wherein the control unit adjusts a light amount of the light source based on a light amount of the light beam received by the light receiving device by a time when a rotation number of the driving unit reaches a target rotation number after activation of the driving unit is started.

12. A scanning apparatus according to claim 1, wherein the control unit controls a rotation number of the driving unit based on the signal output by the output unit.

13. A scanning apparatus comprising:
a light source;
a deflection unit configured to deflect and scan light emitted from the light source;
an output unit configured to receive the light scanned by the deflection unit and output a signal according to a light amount of the light received by the output unit; and
a control unit configured to control an emission state of the light source to perform switching between a first emission state in which the light source continuously emits light and a second emission state in which the light source intermittently emits light, wherein in the second emission state, a time period when the light is emitted is shorter than in the first emission state,
wherein in the first emission state and the second emission state, the light is emitted at least during a time period when the output unit receives the light, the output unit outputs a signal of a first value according to a light amount, in a case where the light received by the output unit has a first light amount and outputs a signal of a second value according to a light amount in a case where the light received by the output unit has a second light amount larger than the first light amount, and
the control unit controls the emission state of the light source to perform switching from the first emission state to the second emission state when an output time period of a signal of the second value corresponding to the second light amount is equal to or less than a predetermined time period.

14. A scanning apparatus according to claim 13, comprising a driving unit configured to drive the deflection unit,
wherein the control unit performs control to perform switching from the first emission state to the second emission state by a time when a rotation number of the driving unit reaches a target rotation number after activation of the driving unit is started.

15. A scanning apparatus according to claim 14, wherein the control unit performs controls switching from the first emission state to the second emission state based on timing of acquiring a signal of one second value output by the output unit when an output time period of the signal of the one second value output by the output unit is equal to or more than the predetermined time period in the first emission state.

16. A scanning apparatus according to claim 15, wherein the control unit predicts a cycle at which the second value in and after the timing of acquiring the signal of the one second value output by the output unit based on an output time period of the signal of the second value after the rotation number of the driving unit reaches the target rotation number, a cycle at which the signal of the second value is output after the rotation number of the driving unit reaches the target rotation number, and the output time period of the signal of the one second value output by the output unit.

17. A scanning apparatus according to claim 14, wherein the predetermined time period is determined based on a predefined output time period of a signal of the second value after the rotation number of the driving unit reaches the target rotation number, a predefined cycle at which the second value is output after the rotation number of the driving unit reaches the target rotation number, and a cycle at which the second value is output and which is based on the output time period of the signal of the second value output in the first emission state.

18. A scanning apparatus according to claim 15, wherein the predetermined time period is determined based on a predefined output time period of the signal of the second value after the rotation number of the driving unit reaches the target rotation number, a predefined cycle at which the signal of the second value is output after the rotation number of the driving unit reaches the target rotation number, and a cycle at which the signal of the second value is assumed to be output when the first emission state is started and which is determined based on a characteristic in activation of the driving unit.

19. An image forming apparatus comprising:
a photosensitive member on which an electrostatic latent image is to be formed;
a scanning apparatus configured to form the electrostatic latent image on the photosensitive member;
a developing unit configured to develop the electrostatic latent image formed on the photosensitive member with toner and to form a toner image; and
a transfer unit configured to transfer the toner image formed on the photosensitive member by the developing unit onto a recording material,
wherein the scanning apparatus includes:
a light source;
a deflection unit configured to deflect and scan light emitted from the light source;
an output unit configured to receive light scanned in a second area different from a first area in which light according to image data is scanned, in an area in which the deflection unit scans the light, and output a signal according to a light amount; and
a control unit configured to control an emission state of the light source to perform switching between a first emission state in which light source emits light to scan the light in the first area and the second area and a second emission state in which the light source emits light to scan the light in the second area,
wherein the output unit outputs a signal of a first value according to a light amount in a case where the light received by the output unit has a first light amount and outputs a signal of a second value according to a light amount in a case where the light received by the output unit has a second light amount larger than the first light amount, and
the control unit controls the emission state of the light source to perform switching from the first emission state to the second emission state in a case where an output time period of a signal of the second value corresponding to the second light amount is equal to or more than a predetermined time period.

20. An image forming apparatus comprising:
a photosensitive member on which an electrostatic latent image is to be formed;
a scanning apparatus configured to form the electrostatic latent image on the photosensitive member;
a developing unit configured to develop the electrostatic latent image formed on the photosensitive member with toner and to form a toner image; and
a transfer unit configured to transfer the toner image, on the photosensitive member, formed by the developing unit to a recording material,
wherein the scanning apparatus includes:
a light source;
a deflection unit configured to deflect and scan light emitted from the light source;
an output unit configured to receive the light scanned by the deflection unit and output a signal according to a light amount of the light received by the output unit; and
a control unit configured to control an emission state of the light source to perform switching between a first emission state in which the light source continuously emits light and a second emission state in which the light source intermittently emits light, wherein in the second emission state, a time period when the light is emitted is shorter than in the first emission state,
wherein in the first emission state and the second emission state, the light is emitted at least during a time period in a case where the output unit receives the light, the output unit outputs a signal of a first value according to a light amount the light received by the output unit has a first light amount and outputs a signal of a second value according to a light amount in a case where the light received by the output unit has a second light amount larger than the first light amount, and
the control unit controls the emission state of the light source to perform switching from the first emission state to the second emission state when an output time period of a signal of the second value corresponding to the second light amount is equal to or less than a predetermined time period.

* * * * *